March 21, 1967 R. E. RALSTON ETAL 3,310,436
RECHARGEABLE CELL AND METHOD OF MAKING A DEPOLARIZING
ELECTRODE THEREFOR
Filed March 30, 1965
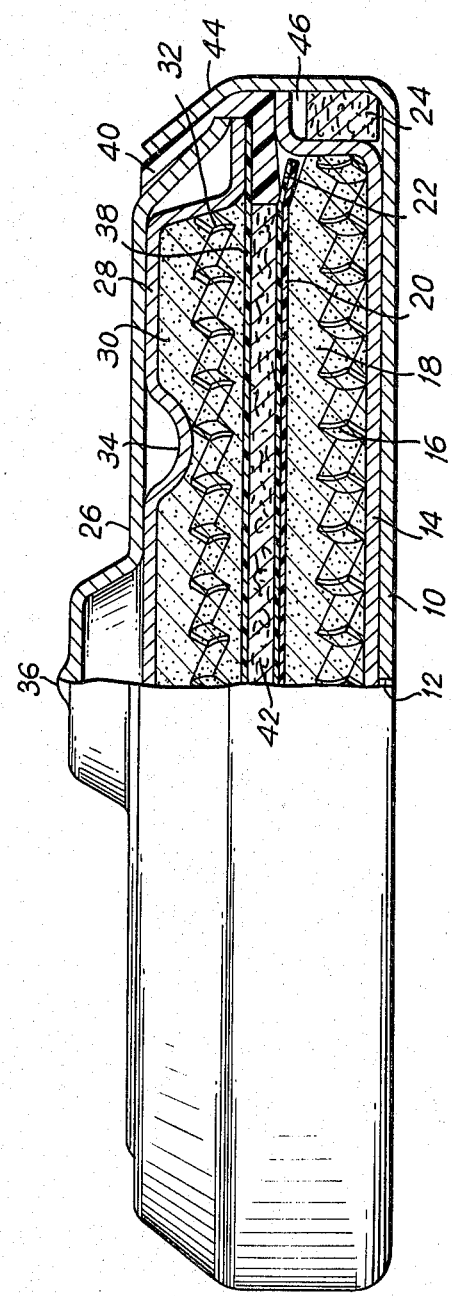
INVENTORS.
ROBERT E. RALSTON
YUNG LING KO
BY GLEE W. STACKHOUSE
ATTORNEY

United States Patent Office

3,310,436
Patented Mar. 21, 1967

3,310,436
RECHARGEABLE CELL AND METHOD OF MAKING A DEPOLARIZING ELECTRODE THEREFOR
Robert E. Ralston, Spring Valley, and Yung Ling Ko, Tarrytown, N.Y., and Glee W. Stackhouse, Indianapolis, Ind., assignors to P. R. Mallory & Co., Inc., Indianapolis, Ind., a corporation of Delaware
Filed Mar. 30, 1965, Ser. No. 443,849
10 Claims. (Cl. 136—6)

This invention relates to electric current producing cells, and, more particularly, to rechargeable cells and to a novel and improved depolarizing electrode for such cells.

Considerable difficulties are usually encountered with rechargeable alkaline cells when the reaction product of either electrode member is a liquid. As an example, the depolarizing electrode of a Zn/KOH/HgO cell is reduced to liquid mercury when the cell is discharged. Heavy metal liquids, such as mercury, are undesirable in sealed rechargeable cells which are required to operate in all positions because absolute confinement of the liquid is necessitated to prevent physical displacement and internal short circuits. Also, recharging efficiency is usually quite low due to the small surface area of liquids as compared to that of powdered metals.

Since HgO is essentially a non-conductor and its reduction product is a liquid, some other material must be used with it to maintain a solid conductive matrix. Considerable experience has been accumulated with mercuric oxide rechargeable cells containing some form of silver as the matrix material. This material, when amalgamated and compacted into the desired shape, produces a rigid porous electrode having a high electrical conductivity and affords a reservoir for mercury. Also, mixtures of the oxides of mercury and silver have been used to accomplish the same end results. Rechargeable cells of the described general type are disclosed and claimed in Ruben Patent 2,554,504 and are in successful commercial use at the present time.

While silver met the main objectives of the positive electrode matrix, namely to maintain the said electrode in the solid form at all times and to improve conductivity, certain of its characteristics were undesirable. One detrimental effect was the influence of the silver oxide, obtained during the charge cycle, on the discharge potential. This was especially undesirable in applications where the discharge voltage had to be maintained within narrow limits. Also, positive electrodes containing silver have been found to give rise to physical distortion after prolonged use. The appearance of this distortion was similar to the shrinkage encountered when certain powdered metals were sintered. The effect on cell performance manifested itself in a gradual decline in useful capacity as the "self-sintering" took place.

It is an object of the present invention to improve rechargeable cells of the described character.

It is another object of the present invention to provide a novel and improved positive electrode for rechargeable cells.

A further object of the invention is to provide a novel matrix material which, in combination with mercuric oxide, constitutes a positive electrode of low resistance, stable potential and long useful life.

The invention also contemplates a novel and improved depolarizing electrode, which may be readily manufactured on a practical and commercial scale.

Other and further objects and advantages of the present invention will become apparent from the following description, taken in conjunction with the accompanying drawing, the single figure of which is a vertical sectional view, having parts in elevation, of a cell embodying the invention.

Broadly stated, the present invention is based on the discovery that the objectives of a satisfactory positive electrode matrix can be met by the addition of palladium metal to the oxide of mercury. Mercury-palladium alloys, properly prepared, are small particle size powders, which can be readily utilized in battery electrodes. The range of palladium in the electrodes may be 3% to 21% by weight palladium, balance mercury. However, it has been found that excessive liquid phase mercury and agglomerates tend to lower performance in alloys containing substantially less than 10% by weight palladium related to the weight of the entire composition. The preferred composition range was found to be 9.5% to 14% by weight palladium, balance mercury.

The mercury-palladium alloy powders may be prepared by various methods, such as by electro-chemical displacement of palladium from solution with metallic mercury. Several approaches were investigated in an effort to prepare material with maximum charge acceptance efficiency. Two methods, both employing $PdCl_2$ as the source of palladium, were found to be best. In the first method, the $PdCl_2$ was dissolved in water acidified with HCl in the amount of approximately 10 grams per liter. Sufficient liquid mercury for the desired alloy was added and the solution stirred until the color changed from dark brown to near colorless. The temperature was maintained at 45° to 60° C. Since chlorides of mercury are formed during the reaction, the composition of the material obtained is somewhat dependent on the filtering and washing techniques. It has been found that the water insoluble chlorides of mercury remaining in the material are not detrimental in the small quantities normally encountered.

In the second method, the material was prepared in alcohol media. As the chlorides of both palladium and mercury are soluble in ethyl alcohol, the displacement reaction takes place quite readily. The following procedure has been followed: The required amount of palladium chloride was dissolved in ethyl alcohol, sufficient liquid mercury for the desired alloy was added and stirred until the solution color changed from dark brown to colorless. Reaction time was usually about 10 minutes at temperatures of 45° to 60° C. Potassium hydroxide was added to precipitate the dissolved mercury as mercury oxide. As an example, with starting material of 9 parts by weight Hg to 1 part by weight Pd (as $PdCl_2$), the end product composition was approximately 70.1% Hg, 20.0% HgO and 9.9% Pd, all percentages being by weight.

The physical characteristics and reaction time are very dependent on agitation methods. Hand stirring in a non-uniform manner has been found to be most effective. Methods which impart a rolling or smearing action on the mercury, such as motor stirring, magnetic stirring, etc., have resulted in particle agglomeration and flakes which exhibit poor electrical characteristics. Also, reaction time might be increased to 6 hours, as compared to the hand stirring time of approximately 10 minutes.

Particle size distribution of the material made by the techniques described above has been found to be quite uniform. Generally, 80% or more of the particles were smaller than 18 microns. Determinations were by the sedimentation method using a Bound Brook Photosedimentometer.

The physical characteristics of the material have allowed a wide range of fabrication techniques to be applied. Conventional powder metallurgy practices have been employed to prepare electrodes of any desired configuration from the alloy powder.

The positive electrode material of the invention may be used in combination with various negative electrode materials of which the preferred one is a mixture composed essentially of 4% to 25% by weight of amalgamated zinc powder, balance zinc oxide. The preferred electrolyte is an aqueous solution of an alkali metal hydroxide, such as KOH, NaOH or LiOH, containing a substantial quantity of alkali metal zincate.

In order that those skilled in the art may have a better understanding of the invention, it will be described in greater detail as applied to a rechargeable cell of the flat type.

Referring now more particularly to the drawing, in the positive electrode subassembly, numeral 10 denotes an outer cell cup of nickel-plated steel having a small central aperture 12 in the bottom surface thereof. A flanged inner cell cup 14 of nickel-plated steel is arranged within the outer cell cup and has a depolarizer screen 16 of expanded metal, such as nickel-plated steel, inserted therein. To assure reliable electrical connection, outer cell cup 10, inner cell cup 14 and screen 16 are spot-welded together. Depolarizer mix 18 of a Hg-Pd alloy, such as one composed of 70.1% Hg, 20.0% HgO and 9.9% Pd, by weight, is pressed into inner cell cup 14. A thin layer of an absorbent-separator 20, such as nonwoven Dynel (a copolymer of vinyl chloride and acrylonitrile) or nylon (a long chain polymeric amide) is placed on the top surface of depolarizer mix 18. Layer 20 is covered by a depolarizer barrier layer 22, which may be made from any compatible, ionically permeable material, such as from microporous polyvinyl chloride. An adapter ring 24 of absorbent paper is provided in the interspace between the inner and outer cell cups. The function of this ring is to trap any electrolyte that may be carried along with the vented gas released from the interior of the cell into the atmosphere through aperture 12, as this will be explained more fully hereinafter.

In the negative electrode subassembly, numeral 26 denotes a dished outer cell top of nickel-plated steel, within which there is a flanged inner cell top 28 of silver-plated steel. A negative electrode material 30, such as a mixture of zinc oxide and amalgamated zinc powder, is pressed into inner cell top 28. In order to assure good electrical contact between the negative electrode material and the inner and outer cell tops, an anode screen 32 of expanded metal, such as silver-plated steel, is embedded into the said material and is welded to an annular indentation 34 in the inner cell top 28. Preferably, the inner and outer cell tops are likewise spot-welded together to provide reliable electrical connection therebetween under all operating conditions. Outer cell top is formed with a central protuberance 36 constituting the negative terminal of the cell, while outer cell cup 10 constitutes the positive terminal of the cell. An anode barrier layer 38, such as one of regenerated cellulose, is provided on the underside of the negative electrode material and extends over the flange of inner cell top 28. An insulating and sealing grommet 40 of a suitable elastomer, such as neoprene or polyethylene, is stretched around the circumferential edges of the inner and outer cell tops.

In assembling the cell, an absorbent-separator 42, such as non-woven Dynel or nylon mat, is placed between the positive and negative electrode sub-assemblies and sufficient electrolyte is introduced to impregnate the active materials and the several porous spacer and barrier layers therebetween. Thereupon, the initially cylindrical circumferential mouth portions of the outer cell cup 10 are crimped inwardly, as indicated at 44, whereby grommet 40 is placed under compression to seal the cell. The electrolyte may be an aqueous solution of an alkali metal hydroxide, preferably a potassium hydroxide solution, which is substantially saturated with zinc oxide. Thus, an electrolyte composed of 39% KOH, 6.25% ZnO, by weight, balance water, was found highly satisfactory for the purposes of the invention. A cell assembled in the above described manner is only partially charged. The normal procedure is to apply a charge cycle before a discharge operation is attempted. The open circuit voltage of such cell, in the charged condition is 1.35 volts.

During operation of the cell, on discharge, the mercuric oxide at the cathode is reduced to metallic mercury which immediately forms a Hg-Pd alloy or amalgam with the palladium, thus avoiding the presence of free-flowing mercury in the cell. As is known, the presence of free-flowing mercury in the cell is very undesirable as it can cause internal short circuits, or other operating difficulties. At the anode, the zinc is converted to its hydroxide. On charge, the mercury contained in the Hg-Pd alloy at the cathode is reoxidized to HgO, while the zinc hydroxide at the anode is reduced to metallic zinc.

It will be noted that, in the cell of the invention, the palladium present in the cathode performs several important functions. First of all, it increases electrical conductivity of the mercuric oxide, which is essentially a non-conductor. It combines with the liquid mercury produced during discharge to convert the said mercury into a form in which it is solid but is still readily available for reconversion into the oxide. Also, it provides in the cathode a chemically inert and dimensionally stable electrically conducting matrix, which remains virtually unchanged throughout a very large number of cycles of charge and discharge. Finally, as palladium is a noble metal, it does not take part in the electrochemical cell reactions. Therefore, the presence of palladium in the cathode has no effect on the voltage of the cell, which remains practically unchanged throughout discharge.

During normal operation of the cell of the invention, practically no gas is generated. In the event, however, that, due to the presence of impurities in the cell materials, or due to overcharging, some gas would be produced, the resulting increase in internal pressure will slightly displace the cell tops upwards in the axial direction. This will reduce the pressure of grommet 40 on the the flange of inner cell cup 14, allowing the gas to flow around the edge of said flange into interspace 46 between the two cell cups. From this interspace, the gas will flow through the greatly constricted channel constituted by the imperfect fit between the outer bottom surface of the inner cell cup and the inner bottom surface of the outer cell cup and is finally released into the atmosphere through aperture 12 of the outer cell cup. Any electrolyte that may be carried along with the vented gas will be absorbed by adapter ring 24 in interspace 46. As soon as the internal cell pressure is reduced to its normal value, the cell tops reseat themselves into their normal sealing position. For further details of the structure and operation of the described cell organization, reference may be had to Colton Patent 2,636,062, disclosing and claiming the so-called "self-venting" structure and to Williams Patent 2,712,565 and Clune Patent 3,096,217, disclosing and claiming various forms of "double top" structure.

Although the present invention has been disclosed in connection with preferred embodiments thereof, variations and modifications may be resorted to by those skilled in the art without departing from the principles of the invention. Thus, anode metals other than zinc, such as cadmium, can be used. All of these variations and modifications are considered to be within the true spirit and scope of the present invention, as disclosed in the foregoing description and defined by the appended claims.

What is claimed is:

1. An electric current producing cell comprising an anode, an electrolyte, and a cathode depolarizer composed essentially of a reducible oxygen yielding compound of mercury and palladium.

2. An electric current producing cell comprising a zinc anode, an electrolyte, and a cathode depolarizer composed essentially of an oxide of mercury reducible to metallic mercury during operation of the cell and palladium in an amount sufficient to form a mercury-palladium alloy of substantially solid consistency with the reduced mercury.

3. A rechargeable cell comprising an amalgamated zinc-zinc oxide anode, an alkaline electrolyte, and a cathode composed essentially of a mercury-palladium alloy.

4. A rechargeable cell comprising an anode composed essentially of a mixture of 4% to 25% by weight of amalgamated zinc powder, balance zinc oxide, an alkaline electrolyte, and a cathode formed from a mercury-palladium alloy composed essentially of 3% to 21% by weight palladium, balance mercury.

5. A rechargeable cell comprising an amalgamated zinc-zinc oxide anode, a cathode pressed from mercury-palladium alloy powder composed essentially of 9.5% to 14% by weight palladium, balance mercury, and an electrolyte of an alkali metal hydroxide solution in contact with said anode and cathode.

6. A rechargeable cell comprising an amalgamated zinc-zinc oxide anode, a cathode, and an alkaline electrolyte interposed between and in contact with said anode and cathode, said cathode being composed essentially of mercury, mercuric oxide and palladium, the proportion of palladium being less than 10% by weight of the cathode.

7. The method of making a mercury-palladium alloy cathode for rechargeable cells, which comprises dissolving $PdCl_2$ in $H_2O$ acidified with HCl, adding liquid Hg to the solution in an amount sufficient for the desired alloy, stirring the solution until its color changes from dark brown to near colorless, and filtering the solution and washing the precipitate to recover the mercury-palladium alloy in the form of a powder.

8. The method claimed in claim 7, wherein the solution is hand-stirred in an irregular manner at a temperature between 45° to 60° C.

9. The method claimed in claim 7, wherein an alkali metal hydroxide solution is added to the colorless solution to precipitate the dissolved mercury as mercuric oxide before the filtering and washing operations.

10. The method of making a mercury-palladium alloy cathode for rechargeable cells, which comprises dissolving the required amount of $PdCl_2$ in ethyl alcohol, adding liquid mercury to the solution in an amount sufficient for the desired alloy, stirring the solution until its color changes from dark brown to colorless, and adding alkali metal hydroxide to the colorless solution to precipitate the dissolved mercury as mercuric oxide.

References Cited by the Examiner
UNITED STATES PATENTS

| | | | |
|---|---|---|---|
| 2,481,539 | 9/1949 | Ruben | 136—107 X |
| 2,554,504 | 5/1951 | Ruben | 136—7.3 |
| 2,850,382 | 9/1958 | Kelly et al. | 75—169 |
| 3,212,934 | 10/1965 | Lander et al. | 136—6 X |

WINSTON A. DOUGLAS, *Primary Examiner.*

D. L. WALTON, *Assistant Examiner.*